US010613229B2

(12) United States Patent
Applegate et al.

(10) Patent No.: US 10,613,229 B2
(45) Date of Patent: Apr. 7, 2020

(54) COMPACT QUADRATURE MACH-ZEHNDER INTERFEROMETER

(71) Applicant: Ball Aerospace & Technologies Corp., Boulder, CO (US)

(72) Inventors: Jeff Applegate, Superior, CO (US); Jason Micali, Erie, CO (US); Sara C. Tucker, Boulder, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 0 days.

(21) Appl. No.: 16/265,589

(22) Filed: Feb. 1, 2019

(65) Prior Publication Data

US 2020/0064484 A1 Feb. 27, 2020

Related U.S. Application Data

(60) Provisional application No. 62/723,675, filed on Aug. 28, 2018, provisional application No. 62/723,690, filed on Aug. 28, 2018, provisional application No. 62/722,549, filed on Aug. 24, 2018, provisional application No. 62/722,705, filed on Aug. 24, 2018.

(51) Int. Cl.
*G01B 9/02* (2006.01)
*G01S 17/95* (2006.01)

(52) U.S. Cl.
CPC .......... *G01S 17/95* (2013.01); *G01B 9/02015* (2013.01)

(58) Field of Classification Search
CPC ....... G01S 17/00; G01B 9/02; G01B 9/02015; G01B 9/02049
See application file for complete search history.

(56) References Cited

U.S. PATENT DOCUMENTS

| | | | |
|---|---|---|---|
| 3,856,402 A | 12/1974 | Low et al. | |
| 4,195,931 A | 4/1980 | Hara | |
| 4,243,323 A * | 1/1981 | Frosch | G01J 9/02 356/455 |
| 4,652,122 A | 3/1987 | Zincone et al. | |
| 4,875,770 A | 10/1989 | Rogers et al. | |
| 4,988,190 A | 1/1991 | Miles | |
| 5,155,551 A | 10/1992 | Vidrine et al. | |
| 5,216,477 A | 6/1993 | Korb | |

(Continued)

OTHER PUBLICATIONS

Grund et al. "Development and Demonstration of an Optical Autocovariance Direct Detection Wind Lidar," Earth Science Technology Forum 2010, 2010, 6 pages.

(Continued)

*Primary Examiner* — Jonathan M Hansen
(74) *Attorney, Agent, or Firm* — Sheridan Ross P.C.

(57) ABSTRACT

An interferometer is provided. The interferometer includes a multifaceted beamsplitter. Angles of incidence between beams entering the beamsplitter and a beamsplitting surface of the beamsplitter are less than 45 degrees. The arms of the interferometer feature a refractive compensator or a catseye optical configuration to provide an optical path length difference for rays that is the same at any location along the effective aperture of the interferometer. A detector assembly can be included with at least four detectors that lie in a plane and that receive light along paths that are orthogonal to that plane.

20 Claims, 9 Drawing Sheets

(56) References Cited

U.S. PATENT DOCUMENTS

| | | | |
|---|---|---|---|
| 5,541,728 A * | 7/1996 | Dierking | G01J 3/4532 |
| | | | 356/451 |
| 6,751,532 B2 | 6/2004 | Inokuchi | |
| 7,359,057 B2 | 4/2008 | Schwiesow | |
| 7,463,341 B2 | 12/2008 | Halldorsson et al. | |
| 7,929,215 B1 | 4/2011 | Grund et al. | |
| 7,933,002 B2 | 4/2011 | Halldorsson | |
| 8,072,584 B2 | 12/2011 | Caldwell et al. | |
| 8,077,294 B1 | 12/2011 | Grund et al. | |
| 8,508,721 B2 | 8/2013 | Cates et al. | |
| 8,509,966 B2 | 8/2013 | Coulmeau et al. | |
| 9,097,799 B2 | 8/2015 | Inokuchi | |
| 9,924,138 B1 | 3/2018 | Brown | |
| 10,184,841 B1 * | 1/2019 | Englert | G01J 9/02 |
| 2008/0043234 A1 | 2/2008 | Mirand et al. | |
| 2009/0091766 A1 | 4/2009 | Hirose | |
| 2011/0222048 A1 | 9/2011 | Englert et al. | |
| 2012/0101747 A1 | 4/2012 | Kielkopf et al. | |
| 2012/0194822 A1 * | 8/2012 | Buijs | G01J 3/0205 |
| | | | 356/451 |
| 2012/0273571 A1 | 11/2012 | Kremer | |
| 2015/0233962 A1 | 8/2015 | Tchoryk et al. | |
| 2016/0202283 A1 | 7/2016 | Wang et al. | |
| 2017/0038192 A1 | 2/2017 | Chen et al. | |
| 2017/0248700 A1 | 8/2017 | Lodden et al. | |

OTHER PUBLICATIONS

Herbst et al. "Design of a monolithic Michelson interferometer for fringe imaging in a near-field, UV, direct-detection Doppler wind lidar," Applied Optics, Sep. 2016, vol. 55, No. 25, pp. 6910-6929.

Tucker et al. "The Athena-OAWL Doppler Wind Lidar Mission," EPJ Web of Conferences, 2016, The 27th International Laser Radar Conference (ILRC 27), vol. 119, 01002, 4 pages.

Tucker et al. "Comparing and contrasting the Optical Autocovariance Wind Lidar (OAWL) and coherent detection lidar," Coherent Laser Radar Conference, Barcelona, Spain, Jun. 17-20, 2013, 4 pages.

International Search Report and Written Opinion for International (PCT) Patent Application No. PCT/US2018/063429, dated Mar. 28, 2019 11 pages.

Notice of Allowance for U.S. Appl. No. 16/044,032, dated Mar. 18, 2019 9 pages.

International Search Report and Written Opinion for International (PCT) Patent Application No. PCT/US2019/028524, dated Aug. 27, 2019 13 pages.

* cited by examiner

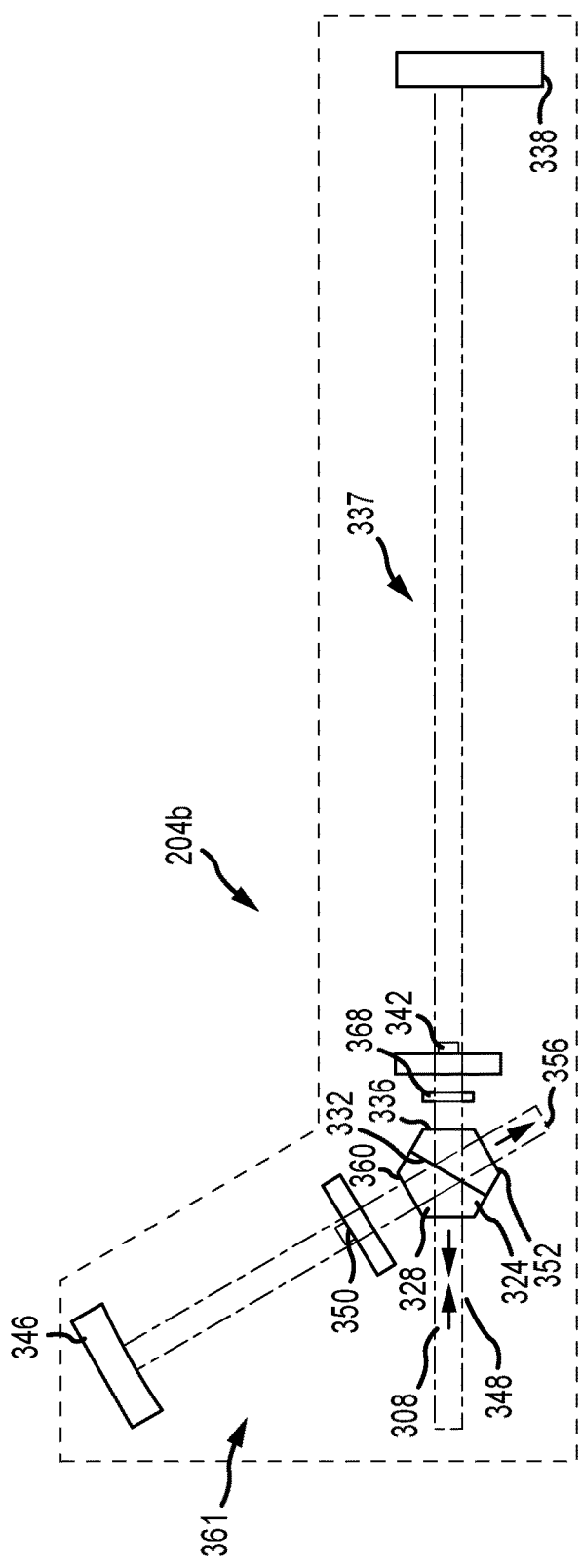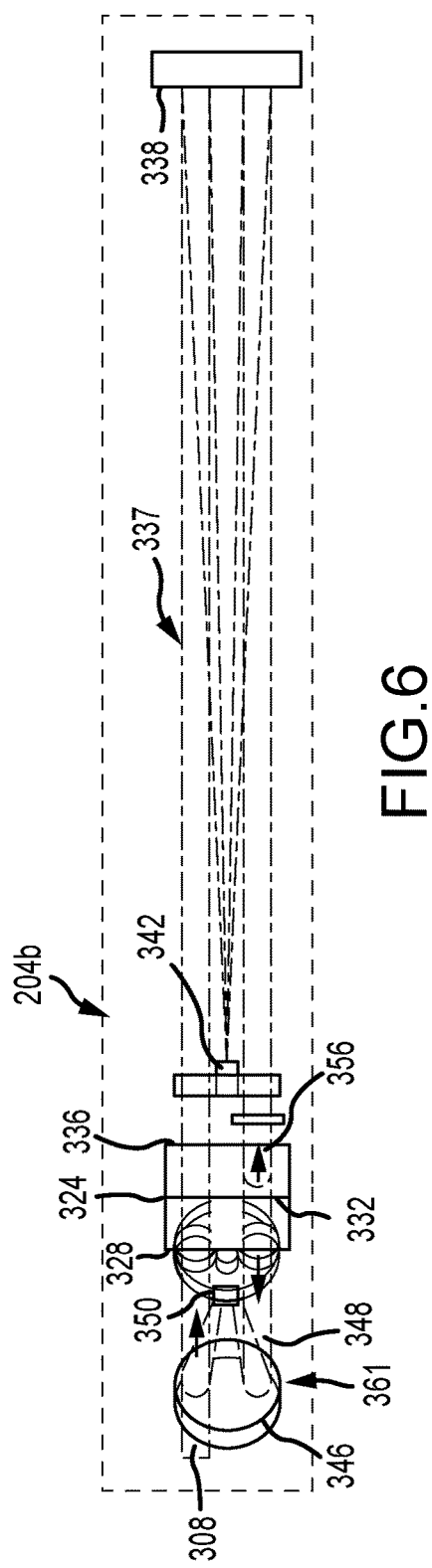

COMPACT QUADRATURE MACH-ZEHNDER INTERFEROMETER

CROSS-REFERENCE TO RELATED APPLICATIONS

This application claims the benefit of U.S. Provisional Patent Application Ser. No. 62/722,549, filed Aug. 24, 2018, the benefit of U.S. Provisional Patent Application Ser. No. 62/722,705, filed Aug. 24, 2018, the benefit of U.S. Provisional Patent Application Ser. No. 62/723,675, filed Aug. 28, 2018, and the benefit of U.S. Provisional Patent Application Ser. No. 62/723,690, filed Aug. 28, 2018, the entire disclosures of which are hereby incorporated herein by reference.

STATEMENT REGARDING FEDERALLY SPONSORED RESEARCH OR DEVELOPMENT

This invention was made with government support under Contract No. N66001-18-C-4001 awarded by the Space and Naval Warfare Systems Command (SPAWAR). The government has certain rights in the invention.

FIELD

The present disclosure is directed to a Mach-Zehnder interferometer lidar system used to remotely measure Doppler frequency shifts for wind speed or vector measurements and clear air turbulence detection.

BACKGROUND

Severe wind conditions such as clear air turbulence encounters by general and commercial aviation continue to pose significant safety and flight efficiency concerns. Almost anyone who has flown commercially has had an unpleasant experience with turbulence. According to some estimates, turbulence encounters account for well over 75% of all weather-related injuries on commercial aircraft and amount to at least $200 M annually in costs due to passenger and crew injuries and aircraft damage. Of particular interest is clear-air turbulence (CAT) which is the turbulent movement of air masses in the absence of any visual clues, such as clouds, and is caused when bodies of air moving at widely different speeds meet. The atmospheric region most susceptible to CAT is the high troposphere at altitudes of around 7,000-12,000 meters (23,000-39,000 ft) as it meets the tropopause. Here CAT is most frequently encountered in the regions of jet streams. At lower altitudes it may also occur near mountain ranges. Consequently, there is an urgent need to provide accurate and real-time wind/turbulence predictions, particularly CAT, and courses-of-actions to meet the needs of aviation communities.

However the real-time information about the current turbulent state of the atmosphere required by pilots and dispatchers for making tactical en-route decisions is not adequately provided via the FAA's thunderstorm avoidance guidelines, by currently operational turbulence forecasts, or by future systems such as such as the Graphical Turbulence Guidance (GTG) "Nowcast" (N-GTG) at NCAR slated to combine turbulence observations, inferences and forecasts to produce new turbulence assessments approximately every 15 minutes.

Light detection and ranging (lidar) systems have been developed that are capable of remotely measuring range-resolved wind speeds for use in various applications, including but not limited to weather forecasting, air quality prediction, air-traffic safety, and climate studies. In general, lidar operates by transmitting light from a laser source to a volume or surface of interest and detecting the time of flight for the backscattered light to determine range to the scattering volume or surface.

A Doppler wind lidar also measures the Doppler frequency shift experienced by the light scattered back to the instrument due to the motions of molecules and aerosols (e.g. particles and droplets) in the atmospheric scattering volumes, which is directly tied to the speed of the wind in that volume, relative to the lidar line of sight (LOS). The wind speed along the LOS is determined by projecting the wind speed and direction (the wind vector) onto that LOS.

One potential application for wind lidar systems is in connection with the detection of atmospheric turbulence. As noted, atmospheric turbulence is a primary cause of weather related injuries to aircraft passengers and flight crews. Accordingly, detecting atmospheric turbulence is of great interest. However, systems for detecting turbulence, and in particular clear air turbulence, that can be carried by aircraft have been unavailable. In particular, a system that was compact and that provided a suitably wide field of view that could be deployed in a conventional aircraft has been unavailable.

SUMMARY

Embodiments of the present disclosure provide a fiber-coupled Mach-Zehnder interferometer that can be used to measure Doppler frequency shifts in ultraviolet (UV) light for wind speed measurement. As examples, such measurements can be used for navigation, weather forecasting, and clear air turbulence detection. Further embodiments of the present disclosure provide a compact, field-widened interferometer that can be carried by spacecraft and used for detecting wind speeds. In this regard, it is noted that different environments may feature different environmental conditions.

For instance, environments may feature relatively large aerosols, including but not limited to dust, as found in the atmosphere of Mars or other planets. These aerosols can be detected using relatively long wavelength signals, such as 1064 nm. In addition, the precision of measurements can be increased by using an interferometer that provides a relatively large optical path difference (e.g. equal to or greater than 0.7 m). Additional embodiment of the present disclosure provide a compact, field-widened interferometer that can be carried by aircraft and used for detecting wind speeds, including but not limited to the detection winds indicative of clear air turbulence. In accordance with still other embodiments of the present disclosure, the interferometer can be used for detecting wind speeds at high altitudes (e.g. from 20 to 30 km), and at ranges of 10 km or greater. Embodiments of the present disclosure, including embodiments intended for use in the detection of CAT, make use of a unique combination of optics which optimize the interferometer's performance, stability, and compactness for long OPD detection of backscatter signal. In accordance with such embodiments, the arm design is of a reflective catseye configuration, and uses a single optic for the beamsplitter, specifically a multifaceted non-polarizing beamsplitter working at a 30° angle of incidence. By using a smaller diameter beam, the beam path from each arm returns to the same beamsplitter optic translated vertically so that the combined output beams are isolated from the input beam or beams. At that point the output beams are folded into detection paths and split according to polarization to fall on the 4 detectors, which are themselves mounted to the same structure as the interferometer Embodiments of the present disclosure can be implemented such that the optics operate with angles of incidence that are less than 45°.

At least some embodiments of the present disclosure make use of a unique combination of optics that optimize the interferometer's performance, stability, and compactness for short optical path difference (OPD) detection of UV backscatter signal. These embodiments of the present disclosure can be implemented as an all refractive design with optics including a multifaceted, non-polarizing beamsplitter that operates at less than a 45° angle of incidence, corner cube retroreflectors which fold the beam in each arm back to the beamsplitter (but translated vertically so the interfered output beams can isolated from the inputs) and a refractive compensator optic which is integral with one of the corner cubes. In accordance with further embodiments of the present disclosure, the non-polarizing beamsplitter operates at a 30° angle of incidence. This optical configuration can provide a more compact and robust packaging concept than is available using other configurations. Moreover, embodiments of the present disclosure can provide an optical autocovariance wind lidar (OAWL) interferometer, that is field widened to allow input of practical fields of light from remote sensing lidar systems (it is multi-mode fiber coupled), in this case with an acceptance angle of >8 degrees (full angle). At least some embodiments include a single, hexagonal-shaped, non-polarizing beamsplitter that serves the functions of beamsplitting and combining in the same optic. This facilitates easier and more intuitive alignment and also provides a higher level of stability against thermal and vibration environments than dual-beamsplitter designs.

The relatively wide field of view of the interferometer design allows the use of a smaller diameter beam which enables more compact optics all around, including the single hex-beamsplitter and combiner optic, and smaller long arm primary mirrors and mounting structures. Taking advantage of the small beam and incorporating detector paths which are integral with the interferometer structure itself makes for a more compact system overall. The complete system from fiber input to detectors forms a modular unit which provides increased flexibility in the higher-level system design, since once assembled and aligned it can be placed wherever needed. In general, the more compact design and use of integrated beamsplitter/combiner optic makes the design more robust against vibration and thermal fluctuations.

Additional features and advantages of embodiments of the disclosed systems and methods will become more readily apparent from the following description, particularly when taken together with the accompanying drawings.

BRIEF DESCRIPTION OF THE DRAWINGS

FIG. 5 is a top plan view of an interferometer in accordance with other embodiments of the present disclosure;

FIG. 6 is a side view of an interferometer in accordance with other embodiments of the present disclosure;

DETAILED DESCRIPTION

Figure 1A:
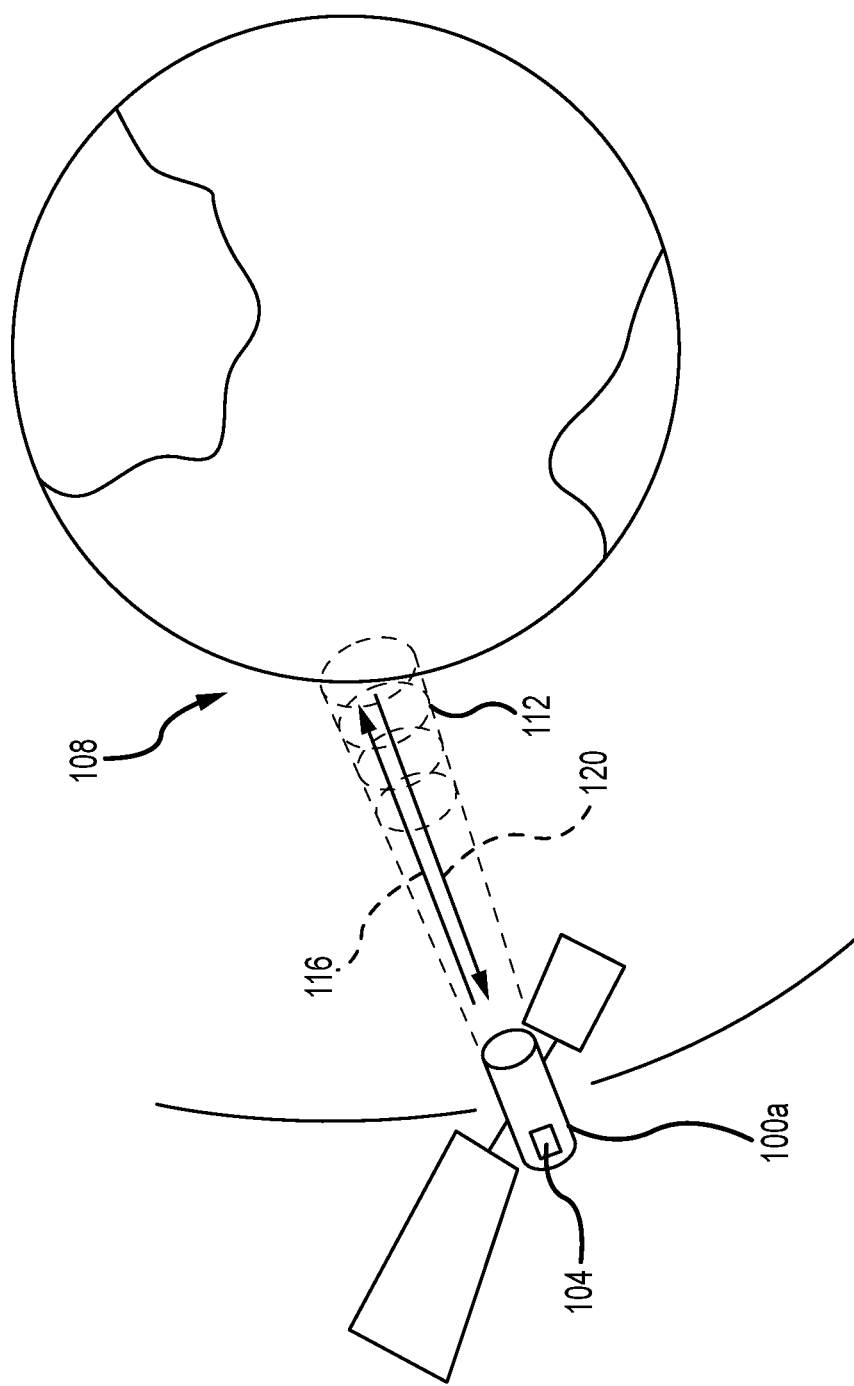
FIG. 1A depicts a spacecraft carrying a lidar system incorporating an interferometer for detecting wind vectors in accordance with embodiments of the present disclosure.
Figure 1B:
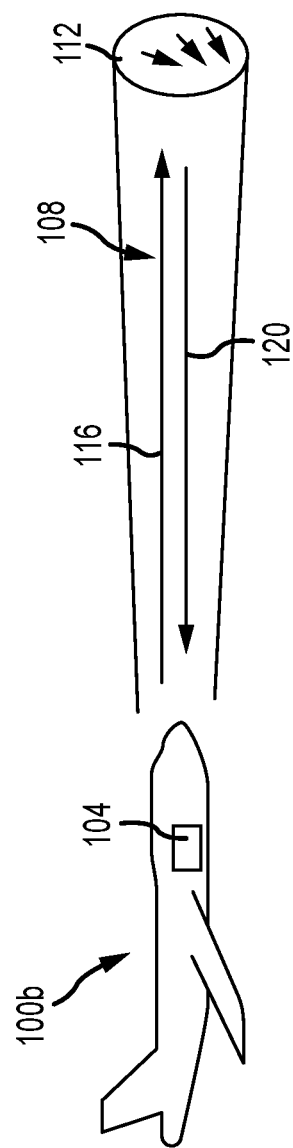
FIG. 1B depicts an aircraft carrying a lidar system incorporating an interferometer for measuring wind vectors for CAT detection and other wind-based phenomena.

FIG. 1A depicts a satellite 100a incorporating a lidar system 104, and FIG. 1B depicts an aircraft 100b incorporating a lidar system 104 in accordance with embodiments of the present disclosure. In addition, an observation area 108 of the lidar system 104, and a target or target volume 112 within the observation area 108, are depicted. The figure also depicts an output signal or beam 116 and a received signal 120. The output beam 116 can include light at multiple wavelengths. The received signal 120 includes light from the output signal 116 that has been backscattered or reflected back toward the lidar system 104 by aerosols and molecules within the target volume 112. As shown, in FIG. 1A, the satellite 100a carrying the lidar system 104 can, in accordance with embodiments of the present disclosure, be placed in an orbit about a planet. Although this is one application of embodiments of the present disclosure, other applications may include placing a lidar system 104 in air such as for measuring wind vectors for CAT detection and other wind-based phenomena as depicted in FIG. 1B, ship, or ground vehicles or locations, looking at the atmosphere either up from the surface or from above, and at look angles in various directions.

Figure 2:
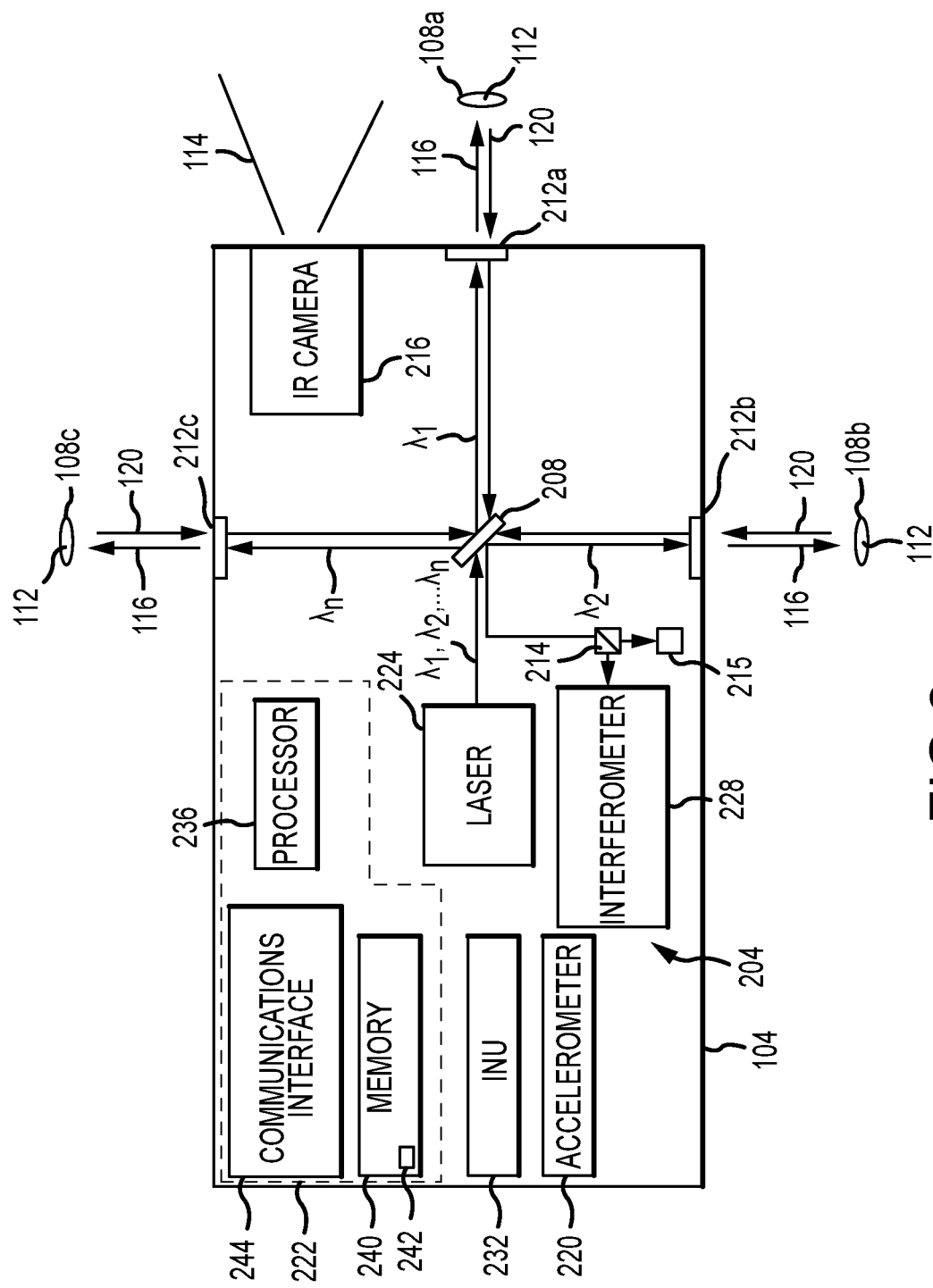
FIG. 2 depicts components of a lidar system in accordance with embodiments of the present disclosure.

FIG. 2 depicts an arrangement of components of a lidar system or instrument 104 in accordance with embodiments of the present disclosure. The lidar system 104 may comprise an optical autocovariance wind lidar that incorporates a laser or light source 224 and an interferometer 228. The laser 224 can output one or more beams of light as an output signal 116. In embodiments in which multiple output signals are produced and directed to different target volumes 112, each of the different output signals 116 may have a different wavelength $(\lambda_1, \lambda_2, \ldots \lambda_n)$ within a time sequenced manner, or simultaneously. Moreover, multiple laser sources 224 operating at different wavelengths can be provided. The lidar system 104 can include a beam division system or mechanism 208 that operates to separate output beams 116 of different wavelengths and direct the separated beams 116 along different lines of sight within different fields of regard 108. The lidar system 104 can also include scan mirrors, variable optics, or other scan mechanisms 212 for scanning an output beam 116 across a target volume 112, and for receiving return signals 120 from along selected lines of sight within the field of regard 108 encompassing the target volume 112. More particularly, the beam division system 208 operates to direct light of different wavelengths along different paths. A scan mechanism 212 can be provided for each of the different paths (wavelengths). Accordingly, a scan mechanism 212a-c can direct a respective beam of output light 116 along a selected look angle within an associated field of regard 108a-c, and can further operate to receive returns 120 from within the associated field of regard 108. Accordingly, scanning mechanisms 212 can scan the output beams 116 to obtain returns 120 from different locations within a target volume 112, such that measurements of wind speed or other phenomena can be made from select locations within the target volume 112.

In accordance with at least some embodiments of the present disclosure, the lidar system 104 includes components for detecting a proportion of cross-polarized light in the return signal 120. In such embodiments, the lidar system 104 can include a polarizing beam splitter 214 that sends co-polarized light included in the return signal 120 to the interferometer 228, and cross-polarized light to one or more detectors 215. More particularly, one detector operable to determine an intensity of the co-polarized light included in the interferometer 228 and one detector 215 operable to determine an intensity of the cross-polarized light is provided for each wavelength of interest.

The lidar system 104 can also include or be operated in association with a wide field of view infrared camera 216. The infrared camera 216, if included, can be operated to obtain spatial and temporal temperature information from within a relatively wide field of view 114, and can be used to measure spatial and temporal temperatures and atmospheric conditions such as turbulence. As an example, but without limitation, the infrared camera 216 may comprise a wide field of view infrared sensor for measuring the spatial and temporal temperatures and atmospheric conditions such as turbulence and providing a large area of surveillance over a wide wavelength range (e.g. 7.5 to 14 µm). For example, the infrared camera 216 can detect the presence of clouds and potential turbulent activity along the direction of travel of the aircraft 100, and such information can be used as an input for making aviation safety weather-related predictions. In addition, such information can be used to assist in steering an output beam 116 of the lidar system 204. As an alternative or in addition to an infrared camera 216, a hyperspectral or multispectral instrument, including an instrument with a wide field of view, can be included in the lidar system 104.

In accordance with further embodiments of the present disclosure, the lidar system 104 can include an accelerometer 220, which can be operated to measure the intensity of turbulence experienced by the aircraft 100, and to provide a correlation between turbulence predictions made through operation of the lidar system 104 and actual turbulence conditions experienced by the aircraft 100.

Embodiments of the lidar system 104 described herein additionally include an inertial navigation unit (INU) 232, such as but not limited to a global positioning system (GPS) INU, which can operate to provide aircraft 100 location information. Such information can be used to support various functions, including but not limited to geo-locating detected or predicted aviation safety related weather conditions.

The various sensors and instruments such as the lidar system 104, the wide field of view camera 216, the accelerometer 220, the beam division 208 and scanning 212 systems, and the related mechanisms of the lidar system 104 can all be interconnected to a control system 222. The various components can work in conjunction with one another and the control system 222 to make measurements of atmospheric conditions, and to make predictions regarding the presence of turbulence in the atmosphere, including but not limited to along the direction of motion of the aircraft 100, to correlate windspeed and temperature measurements and related turbulence predictions to turbulence actually experienced by the aircraft 100, to detect the presence of icing conditions, to detect the presence of volcanic ash or other particles, and to provide such or other information that is pertinent to aviation safety or navigation or detected weather conditions, to other aircraft, aviation safety related weather information consumers, or general weather information consumers.

The control system 222 of the lidar system 104 can include various processing and operating components, including but not limited to a processor 236, memory 240, and a communications interface 244. As can be appreciated by one of skill in the art after consideration of the present disclosure, the processor 236 can include a general purpose programmable processor, a graphics processing unit (GPU), a field programmable gate array (FPGA), a controller, or a set of different processor devices or chips. The memory 240 can include solid-state volatile or non-volatile memory, such as flash memory, RAM, DRAM, SDRAM, or the like. The memory 240 can also include various other types of memory or other data storage devices, such as magnetic storage devices, optical storage devices, or the like.

The processor 236 can generally operate to execute programming code or instructions stored in the memory 240, for the operation of the lidar system 104, including coordination of the operation of components within the multifunctional system 104. Moreover, the processor 236 can execute application programming or instructions stored in the memory 240 for the onboard prediction of aviation safety related weather conditions, and improved flight navigation paths including but not limited to the detection of clear air turbulence along the path of the aircraft 100. In accordance with still other embodiments of the present disclosure, such predictions can be made in connection with wind speed measurements taken by the lidar system 104 along lines of sight other than those within the forward-looking field of regard 108a, such as a downward looking field of regard 108b, or an upward looking field of regard 108c. The measurements can provide shear information related to potential turbulence or enhanced aircraft navigation and fuel efficiency. Data collected or generated by the sensors of the lidar system 104 can be stored in the memory 240, presented to the crew of the aircraft 100, or communicated using the communication interface 244 to other systems, such as aviation safety or navigation related weather information consumers, other aircraft, weather services, or the like.

An example of application programming or instructions that can be stored in the memory 240 and executed by the processor 236 is a deep learning algorithm 242. The deep learning algorithm 242 can operate to collect, fuse, and correlate data generated by the multifunction sensor 104, the infrared camera 216, the accelerometers 220, and external sources. The deep learning algorithm 242 can apply the data to make predictions regarding turbulence and other wind-based aviation safety and efficiency phenomena. This data can also be used to train the deep learning algorithm 242 to enable increasingly accurate predictions of wind based aviation safety phenomena or wind-aided navigation and efficiency. In addition, embodiments of the present disclosure can provide a deep learning algorithm 242 that can alter, or suggest alterations in, the course of the aircraft 100, in order to avoid turbulence or other wind based aviation safety or navigation phenomena.

Figure 3:
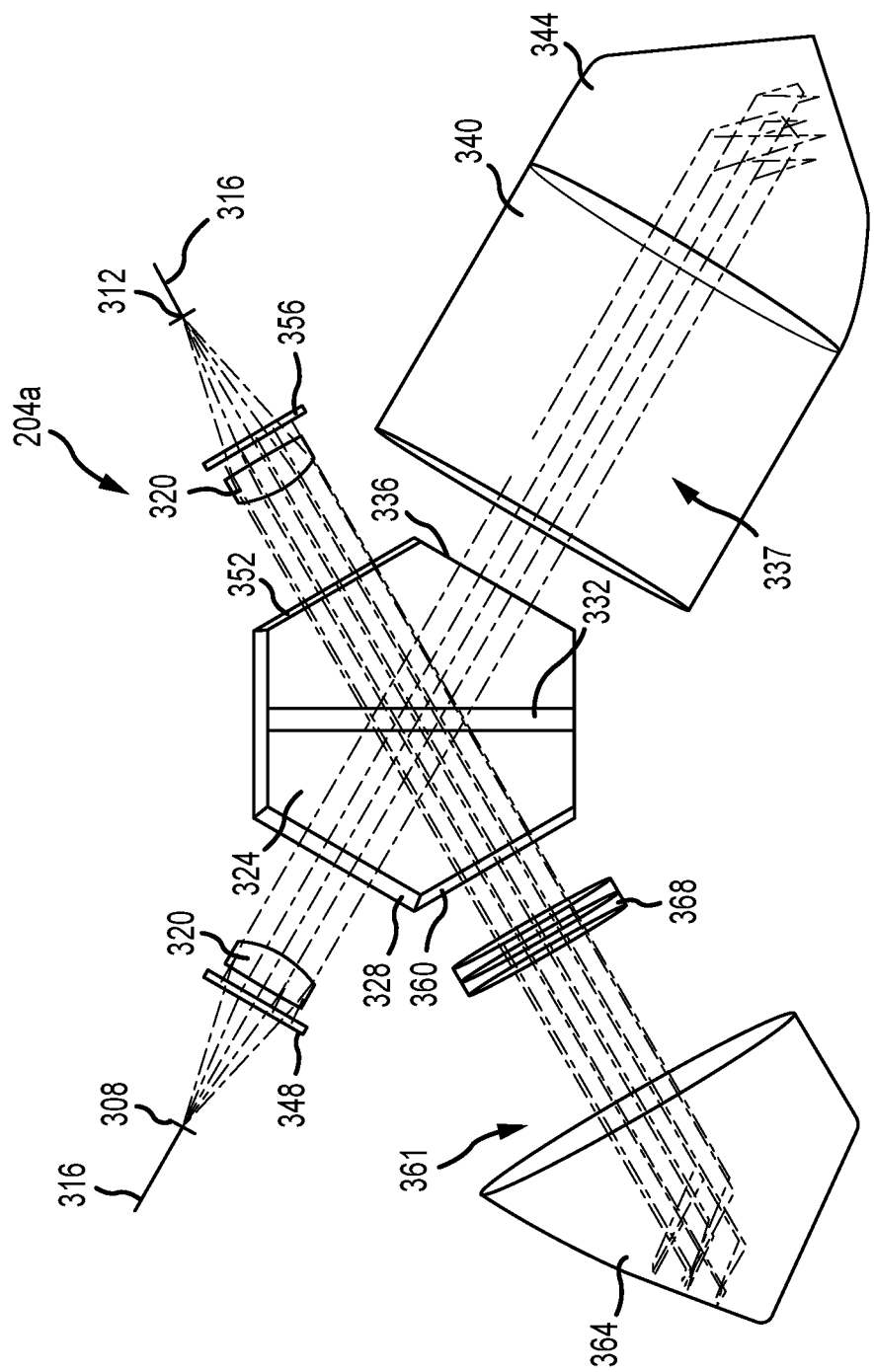
FIG. 3 is a top plan view of an interferometer in accordance with embodiments of the present disclosure.
Figure 4:
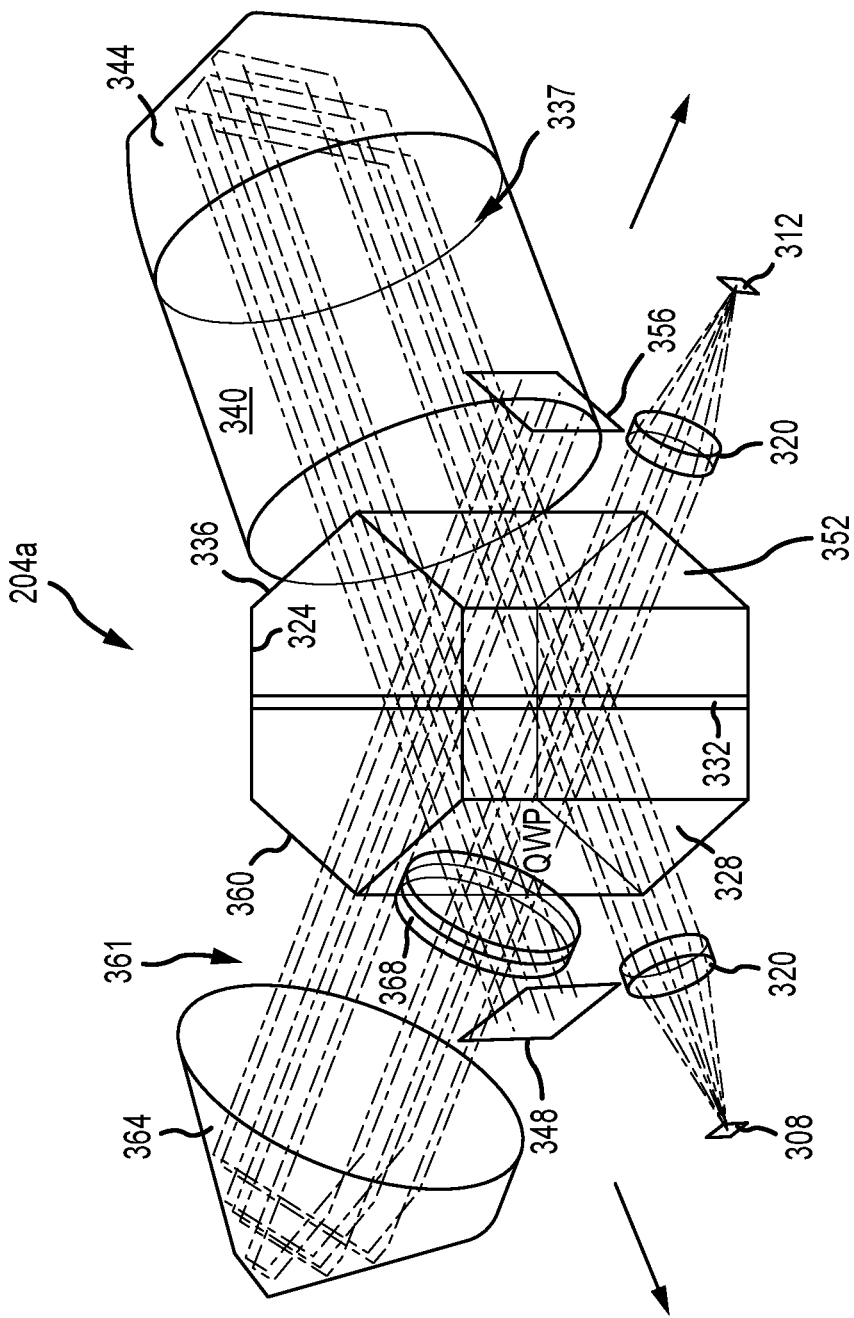
FIG. 4 is a perspective view of an interferometer in accordance with embodiments of the present disclosure.

FIGS. 3-4 illustrate components that may be included in an optical autocovariance wind lidar interferometer 204a, for example that is included in a lidar system 104, in accordance with at least some embodiments of the present disclosure. In particular, the interferometer 204a includes at least a first input 308. The first input 308 can receive a sample of the light output by the lidar system 104 as an output beam 116. In accordance with at least some embodiments of the present disclosure, the interferometer 204a can additionally include a second input 312. The second input 312 can receive light included in a return signal 120. As can be appreciated by one of skill in the art after consideration of the present disclosure, the sample of output light and the return signal can be received at either input 308 or 312 of the interferometer 204a. Moreover, both the sample of output light and the return signal can be received at the same input 308 or 312. Light can be delivered to the inputs 304, 308 through an optical fiber 316, via fiber collimators 320. The input light is directed to a multifaceted beamsplitter 324. In accordance with embodiments of the present disclosure, the beamsplitter 324 may have four or more surfaces that are intersected by a plane along which an input beam 308 is received. For example, but without limitation, the multifaceted beamsplitter 324 may be configured as a hexagonal beamsplitter. The input light is directed so that it is substantially orthogonal to a first face 328 of the multifaceted beamsplitter, where substantially orthogonal is orthogonal plus or minus 10 degrees. The multifaceted beamsplitter 324 includes an internal beamsplitting surface 332. In accordance with embodiments of the present disclosure, the angle of incidence between the input light and the beamsplitting surface 332 is less than 45 degrees. For example, in the illustrated embodiment the angle of incidence is 30 degrees.

A first portion of the incident light (e.g. 50%) is passed by the beamsplitting surface 332. The light passed by the beam splitting surface 332 exits the multifaceted beamsplitter 324 through a second face 336 that is parallel to the first face 332. The light exiting through the second face 336 is then passed through a refractive compensator 340. The refractive compensator 340 slows the light as compared to if the light were traveling through free space, and is configured to provide a field widening effect. In particular, the refractive compensator 340 is configured, for example in length and index of refraction, to provide the same optical path difference for light at any location within an effective beam area. A first corner cube 344 is located at an end of the refractive compensator 340. The first corner cube 344 forms the end of a first or long arm 337 of the interferometer 204a. Moreover, the first corner cube 344 and the multifaceted beamsplitter 324 define a first optical path length. In the illustrated embodiment, the first corner cube 344 receives light from a first (e.g. a lower) portion of the refractive compensator 340, and returns (reflects) the light to a second (e.g. an upper) portion of the refractive compensator 340. Moreover, the beam of light travelling along the first portion can be parallel to the beam of light traveling along the second portion of the refractive compensator 340. The light then exits the refractive compensator 340, and reenters the multifaceted beamsplitter 324 through the second face 336. A first portion of the light from the refractive compensator 340 is then passed by the beam splitting surface 332 towards the first face 328 from which the light exits the multifaceted beamsplitter 324. The light exiting through the first face 328 can be received at a first output element 348. A second portion of the light from the refractive compensator 340 is reflected by the beam splitting surface 332 towards a third face 352 of the multifaceted beamsplitter 324. The light exiting the third face 352 can be received at a second output element 356.

A second portion of the incident light is reflected by the beamsplitting surface 332 so that it exits the multifaceted beamsplitter 324 through a fourth face 360 of the multifaceted beam splitter 324. The light exiting through the fourth face 360 passes through free space (e.g. air) to a second corner cube 364. The second corner cube forms an end of a second arm 361 of the interferometer. Moreover, the second corner cube 364 and the multifaceted beamsplitter 324 define a second optical path length. In the illustrated embodiment, the second corner cube 364 receives light from a first (e.g., a lower) portion of the fourth face 360, and returns the light to a second (e.g. an upper) portion of the fourth face 360. The beam of light that exits the fourth face 360 from the first portion of that face 360 can be parallel to the beam of light that enters the fourth face 360 through the second portion of that face 360. A first portion of the light that enters through the fourth face 360 is reflected by the beam splitter towards the first face 328, while a second portion is passed by the beam splitter 332 towards the third face 352.

A quarter wave plate 368 is included in a path established in one arm of the interferometer 204. For example, as shown in the example, the quarter wave plate 368 can be located in the free space path that extends between the fourth face 360 and the second corner cube 364. The quarter wave plate 368 provides an additional phase difference between vertically and horizontally polarized components of the light.

As can be appreciated by one of skill in the art after consideration of the present disclosure, the first and second arms of the interferometer 204a define different path lengths. Accordingly, light that is directed along the first arm follows a first optical path length, while light that is directed along the second arm follows a second optical path length. More particularly, the refractive compensator 324 and the first corner cube 344 establish a first path having a first path length for light received by the interferometer 204, while the second corner cube 364 establishes a second path having a second path length for the light received by the interferometer 204. Moreover, the light that travels along the first path creates an interference pattern when it is combined with the light that travels along the second path. Characteristics of this interference pattern can be detected at a set of detectors, shown in FIG. 7.

FIGS. 5-6 illustrate components that may be included in an optical autocovariance wind lidar (OAWL) interferometer 204b, such as may be included in a lidar system 104, in accordance with other embodiments of the present disclosure. Components of the interferometer 204b that are the same as or similar to those included in the interferometer 204a depicted in FIGS. 3-4 are assigned the same reference numbers in FIGS. 5-6. The interferometer 204b includes at least a first input 308. The first input 308 can receive a sample of the light output by the lidar system 104 as an output beam 116. The first input 308 can also receive light included in a return signal 120 reflected from aerosols in a target volume 112. As can be appreciated by one of skill in the art after consideration of the present disclosure, and as discussed elsewhere herein, the interferometer 204b can include an additional, second input, and the sample of output light and the return signal can be received at either of the inputs.

The input light is directed to a multifaceted beamsplitter 324, having at least four faces. For example, the multifaceted beamsplitter 324 may comprise a hexagonal beamsplitter. More particularly, the input light is directed so that it is substantially orthogonal to a first face 328 of the multifaceted beamsplitter, where substantially orthogonal is orthogonal plus or minus 10 degrees. The multifaceted beamsplitter 324 includes an internal beamsplitting surface 332. In accordance with embodiments of the present disclosure, the angle of incidence between the input light and the beamsplitting surface 332 is less than 45 degrees. For example, in the illustrated embodiment the angle of incidence is 30 degrees.

A first portion of the incident light (e.g. 50%) is passed by the beamsplitting surface 332. The light passed by the beam splitting surface 332 exits the multifaceted beamsplitter 324 through a second face 336 that is parallel to the first face 328. The light exiting through the second face 336 is then passed to a long arm 337 of the interferometer 204b. The long arm 337 of the interferometer 204b is defined in part by a long arm primary mirror 338, and a long arm secondary mirror 342. In the illustrated embodiment, the light from the first face 328 of the multifaceted beamsplitter 324 is passed through a first (e.g. an upper) portion of the beamsplitter 324, exits from a first (e.g. an upper) portion of the second face 336, and is incident on a first (e.g. an upper) portion of the long arm primary mirror 338. The long arm primary mirror 338 reflects that light to the long arm secondary mirror 342. The long arm secondary mirror 342 in turn reflects the light to a second (e.g. a lower) portion of the long arm primary mirror 338. The long arm primary mirror 338 then reflects the light received from the secondary mirror 342 to a second (e.g. a lower) portion of the second face 336 of the beamsplitter 324. In accordance with embodiments of the present disclosure, the beams of light travelling between the second face 336 of the beamsplitter 324 and the long arm primary mirror 338 are parallel to one another.

A first portion of the light reflected by the long arm primary mirror 338 received at the second portion of the second face 336 is then passed by the beam splitting surface 332 towards the first face 328, from which the light exits the multifaceted beamsplitter 324, and is passed to a first output element 348. A second portion of the light from the long arm is reflected by the beamsplitting surface 332, towards a third face 352 of the beamsplitter 324. The light exiting the third face 352 can be received at a second output element 356.

A second portion of the incident light received at the input 308 is reflected by the beamsplitting surface 332 so that it exits the multifaceted beamsplitter 324 through the fourth face 360 of the multifaceted beam splitter 324, and enters a short arm 361 of the interferometer 204b. The short arm 361 of the interferometer 204b is defined in part by a short arm primary mirror 346, and a short arm secondary mirror 350. In the illustrated embodiment, the light from the first input 308 that is reflected by the beamsplitting surface 332 of the multifaceted beamsplitter 324 is passed through a first (e.g. an upper) portion of the beamsplitter 324, exits from a first (e.g. an upper) portion of the fourth face 360, and is incident on a first (e.g. an upper) portion of the short arm primary mirror 346. The short arm primary mirror 346 reflects that light to the short arm secondary mirror 350. The short arm secondary mirror 350 in turn reflects the light to a second (e.g. a lower) portion of the short arm primary mirror 346. The short arm primary mirror 346 then reflects the light received from the short arm secondary mirror 350 to a second (e.g. a lower) portion of the fourth face 360 of the beamsplitter 324. In accordance with embodiments of the present disclosure, the beams of light travelling between the fourth face 360 of the beamsplitter 324 and the short arm primary mirror 346 are parallel to one another.

In accordance with embodiments of the present disclosure, the primary mirror 338 and the secondary mirror 342 of the long arm 337 and the primary mirror 346 and the secondary mirror 350 of the short arm 361 are in a field widening optical configuration knows as a catseye configuration. A catseye configuration is described in U.S. Pat. No. 7,929,215, the disclosure of which is incorporated herein by reference in its entirety. The catseye configuration includes a non-planar primary mirror that, in combination with the secondary mirror, provides an optical path difference across a field of view of the instrument that, within the long arm or the short arm, is about zero. As a result, the optical path difference across the field of view for the mixed signal is the same. By providing the same optical path difference for rays of light at any location over the effective beam area of the interferometer 204, the effective field of the interferometer 204 is widened. As a result, the contrast of the fringes produced by the mixing of the light from the long and short arms of the interferometer can be improved.

In the example illustrated in FIGS. 5-6, the secondary mirrors 342 and 350 are provided as discrete optics that are fixed to supports that space the secondary mirrors 342 apart from the beamsplitter 324. In alternative embodiments, the secondary mirrors 342 and 350 can be formed on the beamsplitter 324 itself. In particular, the long arm secondary mirror 342 can be formed on the second face 336 of the beamsplitter 324, while the short arm secondary mirror 350 can be formed on the fourth face 360 of the beamsplitter 324. Where a secondary mirror 342 or 350 is formed on the beamsplitter 324, it can comprise a reflective spot coated on a portion of the respective face 336 or 360.

A quarter wave plate 368 is included in a path established in one arm of the interferometer 204b. For example, as shown in the example, the quarter wave plate 368 can be located in the free space path that extends between the second face 336 and the long arm primary mirror 338. The quarter wave plate 368 provides an additional phase difference between vertically and horizontally polarized components of the light.

As can be appreciated by one of skill in the art after consideration of the present disclosure, the long 337 and short 361 arms of the interferometer 204b define different path lengths. Accordingly, light that is directed along the first or long arm 337 follows a first optical path length, while light that is directed along the second or short arm 361 follows a second optical path length. Moreover, the light that travels along the first path creates an interference pattern when it is combined with the light that travels along the second path. Characteristics of this interference pattern can be detected at a set of detectors, shown in FIG. 7.

Figure 7:
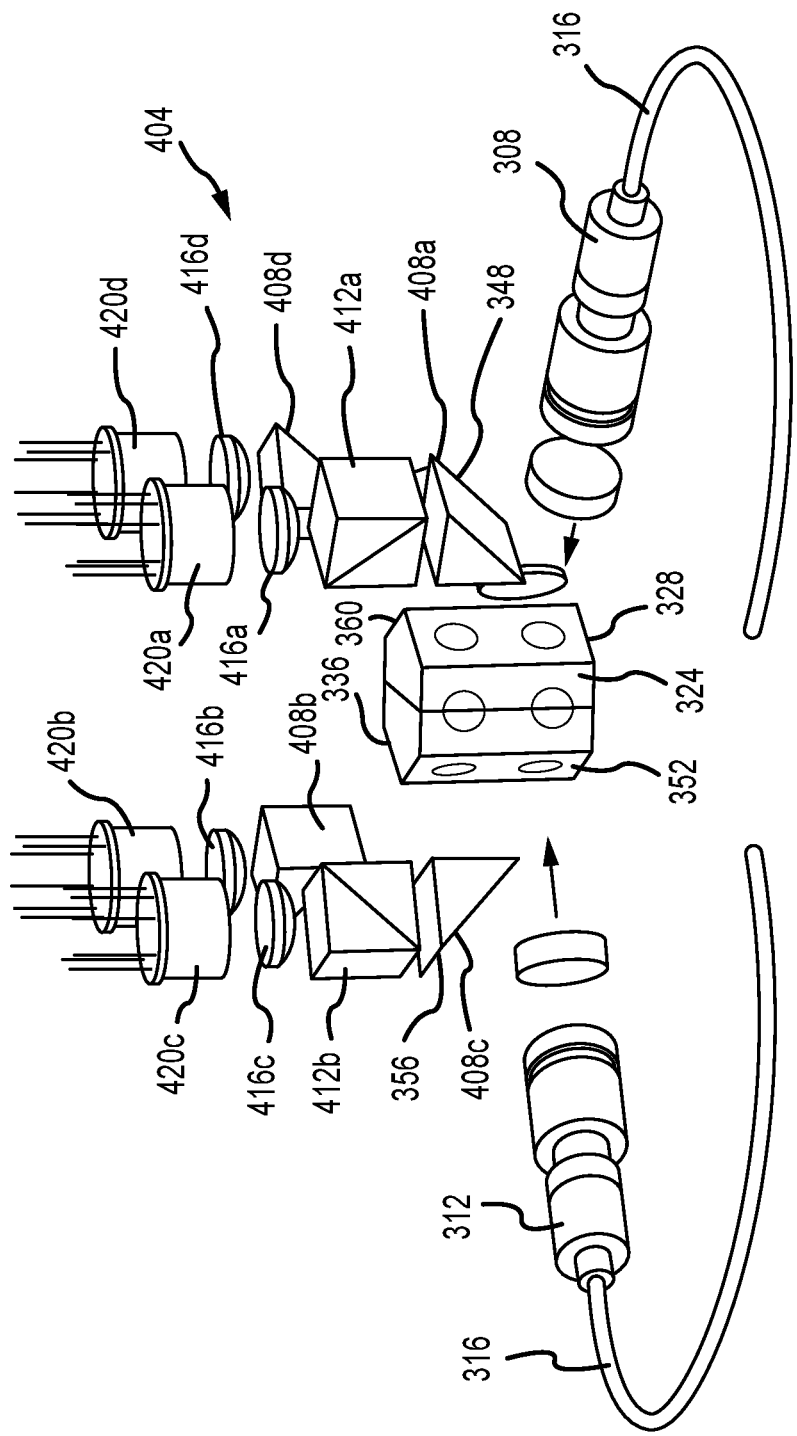
FIG. 7 is a depiction of selected interferometer components, input components, and detector components in accordance with embodiments of the present disclosure.

FIG. 7 depicts the inputs 308 and 312 and the beamsplitter 324 of an interferometer 204, together with an associated detector assembly 404 in accordance with at least some embodiments of the present disclosure. In general, the output elements 348 and 356 receive light that has been passed along the first arm of the interferometer and that has combined or mixed with light that has been passed along the second arm of the interferometer. In the illustrated example, the first output element 348 includes a first fold prism 408a. The first fold prism 408a can be aligned so as to direct the mixed light along a line that is substantially parallel to a plane of a face (e.g. the first 328, second 336, third 352, or fourth 360 face) of the multifaceted beamsplitter 324. The light exiting the first fold prism 408a is passed to a first polarizing beam splitter 412a. Light of a first polarization is passed by the first polarizing beam splitter 412a, directed through a first focusing lens 416a, and received at a first detector 420a. The first polarizing beam splitter 412a directs light of a second polarization to a second fold prism 408b. The second fold prism 408b in turn directs the light to a second detector 420b via a second focusing lens 416b. The second fold prism 408b can be aligned so as to direct the received light along a line that is substantially parallel to the light output from the first fold prism 408a.

The second output element 356 includes a third fold prism 408c. The third fold prism 408c can be aligned so as to direct the mixed light along a line that is substantially parallel to the light directed by the first 408*a* and second 408*b* fold prisms. The light from the third fold prism 408*c* is received at a second polarizing beam splitter 412*b*. Light of the first polarization is passed by the second polarizing beam splitter 412*b*, directed through a third focusing lens 416*c*, and received at a third detector 420*c*. The second polarizing beam splitter 412*b* directs light of the second polarization to a fourth fold prism 408*d*. The fourth fold prism 408*d* in turn directs the light to a fourth detector 420*d* via a fourth focusing lens 416*d*. The fourth fold prism 408*d* can be aligned so as to direct the received light along a line that is substantially parallel to the light output by the other fold prisms 408*a-c*.

As can be appreciated by one of skill in the art after consideration of the present disclosure, the arrangement of the polarizing beam splitters 412, in combination with the inclusion of a quarter wave plate 368 in one arm of the interferometer 204, delays the light received at the different detectors 420 by different amounts. In particular, the samples of the mixed light received at the different detectors 420 are separated in phase from one another by 90 degrees. Thus, by providing detectors 420 in the form of photodetectors that are operable to detect an amplitude (intensity) of light incident thereon, the relative amplitude of the mixed light can be determined, from which the phase shift experienced by the light can be calculated. This in turn enables the relative line of sight speed of molecules or other particles within the target volume 112 to be detected. Moreover, the detectors 420 can be selected and configured to operate at speeds that are fast enough to resolve return from different ranges, and thus from different portions of the target volume 112.

Figure 8:
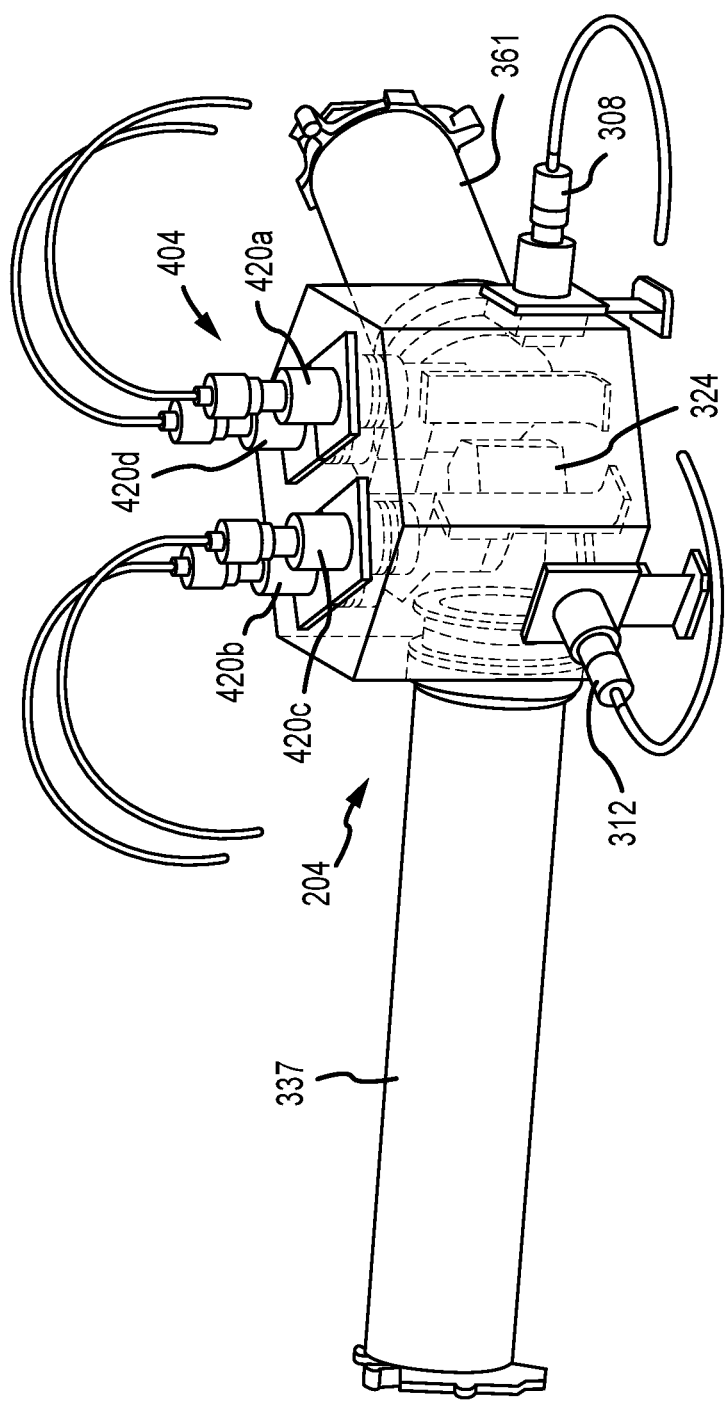
FIG. 8 is a first perspective view of an example implementation of an interferometer and detector assembly in accordance with embodiments of the present disclosure.
Figure 9:
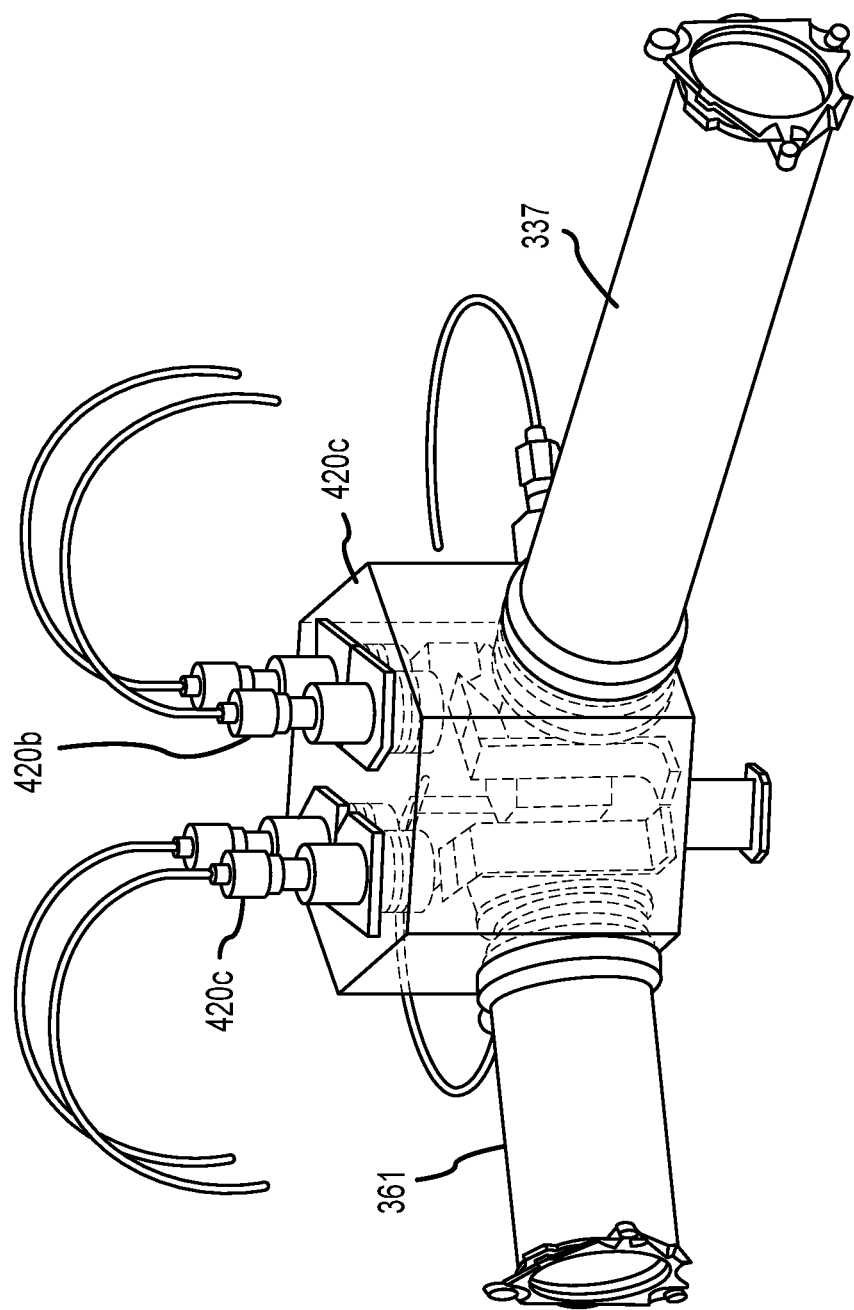
FIG. 9 is a second perspective view of the example implementation of an interferometer and detector assembly in accordance with embodiments of the present disclosure depicted in FIG. 8.

FIGS. 8-9 are perspective views of an example implementation of an interferometer 204 and detector assembly 404 in accordance with embodiments of the present disclosure. As shown, the resulting instrument can integrate a detector assembly 404 with a field-widened, catseye optic interferometer 204, such as embodiments of an interferometer 204*b* illustrated in FIGS. 5-6 having a relatively large optical path difference in a compact assembly. Moreover, by providing optical fiber connections, components of the instrument can be placed in a convenient location in a spacecraft or other platform.

Embodiments of the present disclosure provide a compact, field-widened Mach-Zehnder interferometer 204 that can be implemented for wavelengths from the UV (including 355 nm) to the IR (including 1064 nm). The interferometer includes two fiber-coupled inputs, either or both of which may be used at one time, and 4 output detection channels. Light input from either multi-mode fiber is split by a multifaceted non-polarizing beamsplitter 324 into two unequal path length arms. As an example, the arms may have an optical path difference (OPD) of 0.7 m between them. In each arm the beam is returned to the single multifaceted-shaped beamsplitter and combiner optic 324 along a path that is shifted vertically so that beams combining to form the outputs are physically separated from the input beam(s). In one arm a retarder with one quarter wave retardance at the operating wavelength provides an additional phase difference between vertical and horizontally polarized light. Polarization optics consisting of Polarizing Beamsplitter (PBS) cubes in each of the output paths separate these two polarization states to provide a total of 4 detection channels which are in phase quadrature with respect to each other. Each of the 4 polarization-specific beams are then focused onto detectors. The detected signals can be used for optical autocovariance detection of lidar return light, whereby the signal strengths in the 4 channels are used to fit the phase of the autocorrelation function of the light, and then the Doppler frequency shift and hence wind speed along the lidar line of sight are inferred from the relative change in phase of the signal between the sampled outgoing beam and that of the return light.

At least some embodiments of the present disclosure, including as depicted by the example configuration shown in FIGS. 3-4, provide an interferometer 204*a* and detector assembly 404 that are compact, and suitable for deployment on an aircraft for the detection of clear air turbulence. In accordance with exemplary embodiments of the present disclosure, a compact, field-widened Mach-Zehnder interferometer operating at 355 nm, consisting of two fiber-coupled inputs, and 4 output detection channels is provided. Light input from either multi-mode fiber is split by a hexagonal-shaped non-polarizing beamsplitter into two unequal path length arms, having an optical path difference (OPD) of 3.3 cm between them. A refractive compensator optic consisting of a slab of Ultraviolet Fused Silica (UVFS) glass increases the optical path length experienced by the beam in one arm. In each arm the beam is returned along the same direction back towards the beamsplitter 324 via glass corner cube retroreflectors, which also translate the beam vertically so that they are physically separated from the input beams. In one arm a retarder with one quarter wave retardance at 355 nm provides an additional phase difference between vertical and horizontally polarized light. Polarization optics consisting of PBS cubes in each of the output paths separate these two polarization states to provide a total of 4 detection channels which are in phase quadrature with respect to each other. Each of the 4 polarization-specific beams are then focused onto detectors. The detected signals can be used for optical autocovariance detection of lidar return light, whereby the signal strengths in the 4 channels are used to fit the phase of the autocorrelation function of the light, and then the Doppler frequency shift and hence radial wind speed are inferred from the relative change in phase of this signal between the sampled outgoing beam and that of the return light.

Although embodiments of an interferometer 204 have been discussed that incorporate a multifaceted beamsplitter 224 have been discussed, other configurations are possible. For example, any beamsplitter that provides angles of incidence of less than 45 degrees relative to a line orthogonal to a beamsplitting surface can be used.

Embodiments of the present disclosure can include, but are not limited to:

1. Mach-Zehnder interferometer for Optical Autocovariance Wind Lidar (OAWL) windspeed measurement over a wide wavelength band including but not limited to UV (355 nm) to Long Wave Infrared (e.g., 1.55 microns) wavelengths, optimized for aerosol return with a relatively long (0.7 m) optical path difference (OPD) between the two arms with applicability to CAT detection or other wind-based phenomena.

2. Single monolithic beamsplitter/combiner optic in multifaceted configuration with AOI=30° makes a more easily manufacturable coating with high performance characteristics, compared to more traditional beamsplitter cube and its angle of incidence (AOI)=45°.

3. Detector path optics and detectors themselves are integrated into the Interferometer (IFO) structure.

4. Smaller diameter beam, monolithic beamsplitter/combiner optic, and integrated detection path design combine to form considerably more compact interferometer-detection system than other designs having similar OPD.

5. Makes use of multi-mode fiber coupled inputs for modularity and flexible integration with OAWL systems. The two inputs provided are co-aligned with respect to each other.

6. 4-channel detection system is integrated into the same package so that no free-space output coupling is required AOI at refractive compensator and other refractive components is at normal incidence, for maximum field widening.

7. Improved thermal stability and insensitivity to vibration relative to other OAWL designs, due to overall compactness of the design, Invar base structure, and optic bonding methods.

The foregoing discussion of the disclosed systems and methods has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. An interferometer, comprising:
a multifaceted beamsplitter, wherein the multifaceted beamsplitter includes a beam splitting surface, wherein the multifaceted beam beamsplitter includes at least first, second, third, and fourth faces, and wherein the first face of the multifaceted beamsplitter is at an angle of less than 45 degrees relative to a line normal to the beam splitting surface;
a first reflector element forming an end of a first arm having first optical path length, wherein light passed from the second face of the multifaceted beamsplitter to the first reflector element is reflected from the first reflector element to the second face of the multifaceted beamsplitter;
a second reflector element forming an end of a second arm having a second optical path length, wherein the second optical path length is different than the first optical path length, wherein light passed from the fourth face of the multifaceted beamsplitter to the second reflector element is reflected from the second reflector element to the fourth face of the multifaceted beamsplitter; and
a first output element adjacent at least one of the first and third faces of the multifaceted beamsplitter, wherein light that has travelled along the first arm and light that has traveled along the second arm is received at the first output element.

2. The interferometer of claim 1, wherein an optical path difference for rays of light within a given one of the arms is the same for any angle of incidence of the rays.

3. The interferometer of claim 1, further comprising:
a first input, wherein light from the first input is directed to and enters the multifaceted beamsplitter through the first face of the multifaceted beamsplitter, and wherein the light from the first input is substantially orthogonal to the first face of the multifaceted beamsplitter.

4. The interferometer of claim 3, further comprising:
an optical fiber, wherein light is delivered to the first input by the optical fiber.

5. The interferometer of claim 3, wherein the multifaceted beamsplitter is a hexagonal beamsplitter, and wherein the first face of the multifaceted beamsplitter is parallel to the second face of the multifaceted beamsplitter.

6. The interferometer of claim 5, wherein the first output element is adjacent the first face of the multifaceted beamsplitter.

7. The interferometer of claim 6, further comprising:
a second input, wherein light from the second input is directed to the third face of the multifaceted beamsplitter.

8. The interferometer of claim 7, wherein a sample of light output from a light source is provided from a first one of the first input and the second input, and wherein a return signal is provided from a second one of the first input and the second input.

9. The interferometer of claim 6, further comprising:
a second output element, wherein the second output element is adjacent the third face of the multifaceted beamsplitter, and wherein light that has travelled along the first arm and light that has traveled along the second arm is received at the second output element.

10. The interferometer of claim 9, further comprising:
a detector assembly, wherein the first output element directs light to first and second detectors included in the detector assembly, and wherein the second output element directs light to third and fourth detectors included in the detector assembly.

11. The interferometer of claim 10, wherein the first output element includes a first fold prism that directs light to a first polarizing beamsplitter that in turn directs light of a first polarization to the first detector and light of a second polarization to the second detector.

12. The interferometer of claim 11, wherein the second output element includes a second fold prism that directs light to a second polarizing beamsplitter that in turn directs light of the first polarization to the third detector and light of the second polarization to the fourth detector.

13. The interferometer of claim 10, wherein the detectors lie in a first plane, and wherein light enters the respective detectors along lines that are all orthogonal to the first plane.

14. The interferometer of claim 12, wherein an interference pattern received at the second detector is delayed by a nominal 90 degrees relative to an interference pattern received at the first detector, wherein an interference pattern received at the third detector is delayed by a nominal 90 degrees relative to an interference pattern received at the second detector, and wherein an interference pattern received at the fourth detector is delayed by a nominal 90 degrees relative to an interference pattern received at the third detector.

15. The interferometer of claim 14, wherein the detectors are photodetectors.

16. The interferometer of claim 1, wherein the first reflector element is a first corner cube, and wherein the second reflector element is a second corner cube.

17. The interferometer of claim 16, further comprising:
a refractive compensator, wherein the refractive compensator intersects an optical path between the first corner cube and the first face of the multifaceted beamsplitter.

18. The interferometer of claim 1, wherein the first reflector element is a first primary mirror, wherein the first arm includes a first secondary mirror, wherein the optical path length for any ray of light passed along the first arm is the same, wherein the second reflector element is a second primary mirror, wherein the second arm includes a second secondary mirror, and wherein the optical path length for any ray of light passed along the second arm is the same.

19. A lidar system, comprising:
  a light source;
  an interferometer, including:
    a multifaceted beamsplitter, wherein the multifaceted beamsplitter is a hexagonal beamsplitter that includes at least first, second, third, and fourth faces lying in respective planes, wherein each of the planes of the first, second, third, and fourth faces is at an angle of less than 45 degrees to a plane of a beam splitting surface of the multifaceted beamsplitter;
    a first arm, wherein light exiting the second face of the multifaceted beamsplitter and directed along the first arm travels a first distance and is reflected back to the second face of the multifaceted beamsplitter; and
    a second arm, wherein light exiting the fourth face of the multifaceted beamsplitter and directed along the second arm travels a second distance and is reflected back to the fourth face of the multifaceted beamsplitter, wherein the first distance is different than the second distance, and wherein the light directed along the first arm is mixed with the light directed along the second arm to generate an interference pattern;
  a plurality of detectors, wherein each detector in the plurality of detectors receives a different phase of the generated interference pattern; and
  a processor, wherein signals from the detectors are provided as inputs to the processor.

20. A method for measuring wind vectors, comprising:
  outputting light towards a target volume;
  receiving light reflected from particles in the target volume;
  passing the received light through a first face of a multifaceted beamsplitter;
  splitting the received light into first and second portions, wherein the first portion is passed to a second face of the multifaceted beamsplitter, wherein the second portion is reflected by a beamsplitting surface of the multifaceted beamsplitter to a fourth face of the multifaceted beamsplitter, wherein a plane of the beam splitting surface is at an angle of less than 45 degrees to a plane of the second face, wherein the plane of the beam splitting surface is at an angle of less than 45 degrees to a plane of the fourth face, wherein the first portion travels a first distance from the second face to a first reflector and from the first reflector back to the second face, and wherein the second portion travels a second distance from the fourth face to a second reflector and from the second reflector back to the fourth face; and
  passing at least some of a first one of the first and second portions received back at the second and fourth faces respectively to the first face;
  reflecting at least some of a second one of the first and second portions received back at the second and fourth faces respectively to a third face of the multifaceted beamsplitter;
  receiving the at least some of the first and second portions at a detector adjacent at least one of the first and third faces.

* * * * *